(12) United States Patent
Hosek

(10) Patent No.: US 9,041,336 B2
(45) Date of Patent: May 26, 2015

(54) ROBOT HAVING REPEATABLE DISTURBANCE COMPENSATION ALGORITHM

(71) Applicant: Persimmon Technologies, Corp., Wakefield, MA (US)

(72) Inventor: Martin Hosek, Lowell, MA (US)

(73) Assignee: Persimmon Technologies, Corp., Wakefield, MA (US)

( * ) Notice: Subject to any disclaimer, the term of this patent is extended or adjusted under 35 U.S.C. 154(b) by 167 days.

(21) Appl. No.: 13/793,665

(22) Filed: Mar. 11, 2013

(65) Prior Publication Data

US 2014/0139162 A1    May 22, 2014

Related U.S. Application Data

(60) Provisional application No. 61/727,813, filed on Nov. 19, 2012.

(51) Int. Cl.
*B25J 15/02* (2006.01)
*H02P 6/10* (2006.01)

(52) U.S. Cl.
CPC ............................... *H02P 6/10* (2013.01)

(58) Field of Classification Search
CPC ........................................................ H02P 6/10
USPC .............. 318/560, 565, 567, 568.12, 568.13, 318/568.21, 568.22, 571, 432, 561, 632, 318/633, 568.11, 568.2; 901/3, 5, 15, 19, 901/45; 706/45
See application file for complete search history.

(56) References Cited

U.S. PATENT DOCUMENTS

| | | | |
|---|---|---|---|
| 5,444,341 A | 8/1995 | Kneifel, II et al. ............. 318/432 |
| 6,218,801 B1 * | 4/2001 | Brog.ang.rdh et al. ........ 318/567 |
| 7,805,218 B2 * | 9/2010 | Nagasaka ...................... 700/245 |
| 8,058,827 B2 | 11/2011 | Iwashita et al. ........... 318/400.23 |
| 2009/0243413 A1 * | 10/2009 | Gilchrist et al. ............. 310/90.5 |
| 2011/0084636 A1 | 4/2011 | Kyllingstad .............. 318/400.23 |

\* cited by examiner

*Primary Examiner* — Antony M Paul
(74) *Attorney, Agent, or Firm* — Harrington & Smith

(57) ABSTRACT

A controller for a substrate transport apparatus. The controller includes a first system and a second system for at least partially controlling a movement of a motor of the substrate transport apparatus. The first system is configured to control the movement of the motor based upon a signal from a position sensor. The position sensor outputs the signal based upon a position of a rotor of the motor relative to a stator of the motor. Torque output of the motor is at least partially controlled based upon the signal from the position sensor. The second system for at least partially controlling the movement of the motor is based upon expected disturbances during movement of an arm of the substrate transport apparatus by the motor, where the second system is configured to at least partially increase and/or decrease the torque output of the motor by first system.

18 Claims, 3 Drawing Sheets

ROBOT HAVING REPEATABLE DISTURBANCE COMPENSATION ALGORITHM

CROSS REFERENCE TO RELATED APPLICATION

This application claims priority under 35 USC 119(e) on U.S. Provisional application No. 61/727,813 filed Nov. 19, 2012 which is hereby incorporated by reference in its entirety.

BACKGROUND

1. Technical Field

The exemplary and non-limiting embodiments relate generally to a substrate transport apparatus and, more particularly, to motor control.

2. Brief Description of Prior Developments

U.S. patent publication No. 2009/0243413 A1 disclosed anti-cogging elements to minimize cogging disturbances.

SUMMARY

The following summary is merely intended to be exemplary. The summary is not intended to limit the scope of the claims.

In accordance with one aspect, an example embodiment comprises a controller for a substrate transport apparatus. The controller includes a first system and a second system for at least partially controlling a movement of a motor of the substrate transport apparatus. The first system is configured to control the movement of the motor based upon a signal from a position sensor. The position sensor outputs the signal based upon a position of a rotor of the motor relative to a stator of the motor. Torque output of the motor is at least partially controlled based upon the signal from the position sensor. The second system for at least partially controlling the movement of the motor is based upon expected disturbances during movement of an arm of the substrate transport apparatus by the motor, where the second system is configured to at least partially increase and/or decrease the torque output of the motor by first system.

In accordance with another aspect, an example method comprises providing an apparatus comprising a drive and a movable arm assembly connected to the drive, where the drive comprises a stator and a rotor; controlling, at least partially, a movement of the motor by an output from a motor position sensor; and additionally controlling, at least partially, the movement of the motor by an output from a disturbance compensation system, where the output from the disturbance compensation system increases and/or decreases torque output of the motor versus torque output of the motor without the disturbance compensation system output.

In accordance with another aspect, an example apparatus comprises a non-transitory program storage device readable by a machine, tangibly embodying a program of instructions executable by the machine for performing operations, the operations comprising: controlling, at least partially, a movement of a motor of a substrate transport apparatus by an output from a servo controller system for the motor to control torque output of the motor; and additionally controlling, at least partially, the movement of the motor by an output from a disturbance compensation system, where the output from the disturbance compensation system causes an increase and/or decrease in the torque output of the motor.

BRIEF DESCRIPTION OF THE DRAWINGS

The foregoing aspects and other features are explained in the following description, taken in connection with the accompanying drawings, wherein.

DETAILED DESCRIPTION OF EMBODIMENT

Figure 1:
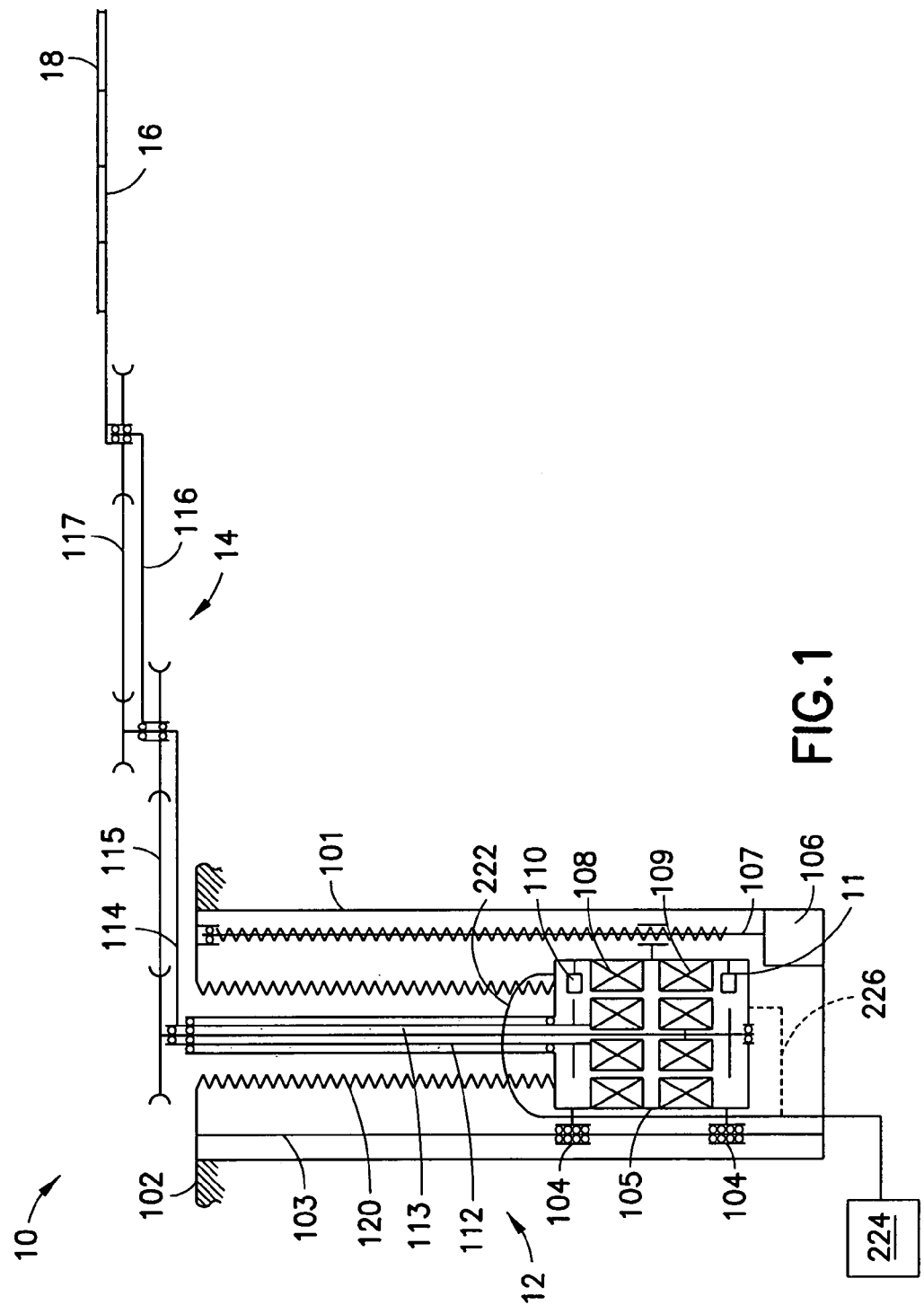
FIG. 1 is a schematic diagram illustrating an apparatus comprising features.

Referring to FIG. 1, there is shown a schematic view of an apparatus 10 incorporating features of an example embodiment. Although the features will be described with reference to the example embodiment shown in the drawings, it should be understood that features can be embodied in many alternate forms of embodiments. In addition, any suitable size, shape or type of elements or materials could be used.

In this example embodiment the apparatus 10 is a substrate transport apparatus comprising a drive 12 and a movable arm assembly 14 having an end effector 16. The end effector 16 is configured to support a substrate 18 thereon. The substrate transport apparatus 10 is configured to move the substrate between at least two spaced locations.

Although the drive 12 is described with respect to a vacuum robot, any suitable robot drive (atmospheric or otherwise) may be provided having features as disclosed. In this example the drive 12 is built around a frame 101 (e.g., an aluminum extrusion) suspended from a flange or mounting arrangement 102. Alternatively, the mounting arrangement may be on the side of frame 101, at the bottom of frame 101, or frame 101 may be mounted in any other suitable manner. Frame 101 may incorporate one or more vertical rail 103 with linear bearings 104 to provide guidance to housing 105 driven by motor 106 via ball-screw mechanism 107, Only one rail 103 is shown for simplicity. Alternatively, motor housing 105 may be driven by a linear motor, attached directly to frame 101 or coupled to frame 101 in any other suitable movable or unmovable manner.

Motor housing 105 may incorporate one, two, three, four or more direct-drive modules. Housing 105 may house motors 108, 109 equipped with position encoders 110 and 111. Housing 105 is shown as an exemplary structure where housing 105 may have portions configured with respect to motors 108, 109 and position encoders 110 and 111 as will be described in greater detail below. Bellows 120 may be used to accommodate motion of motors 108, 109 along vertical rail(s) 103, separating the environment where movable components of motors 108, 109 and encoders 110, 111 operate, for instance vacuum, from the outside environment, for example, atmosphere.

In the example of FIG. 1, two direct-drive modules, each having one motor and one encoder, are shown. However, any suitable number of direct-drive modules with any suitable number of motors and encoders may be used. Inverted service loop 222 may be utilized to supply power to the direct-drive module(s) and facilitate signaling between the direct-drive module(s) and other components of the robotic system, such as a controller 224, as shown in FIG. 1. Alternatively, a regular, non-inverted service loop 226 may be employed. As shown in FIG. 1, upper motor 108 may drive hollow outer shaft 112 connected to first link 114 of the robot arm. Lower motor 109 may be connected to coaxial inner shaft 113 which may be coupled via belt drive 115 to second link 116. Another belt arrangement 117 may be employed to maintain radial orientation of third link 16 regardless of the position of the first two links 114 and 116. This may be achieved due to a 1:2 ratio between the pulley incorporated into the first link and the pulley connected to the third link for example. Third link 16 may form an end-effector that may carry payload 18, for instance, a semiconductor substrate.

It should be noted that the robotic arm of FIG. 1 is shown for exemplary purposes only. Any other suitable arm mechanism or drive mechanism may be used either alone or in combination. For example, multiple direct-drive modules according to one or more embodiments may be utilized in a single robotic manipulator or a robotic manipulator having multiple manipulators or any suitable combination. Here, the modules may be stacked in different planes along substantially the same axis of rotation, located concentrically in substantially the same plane, arranged in a configuration that combines the stacked and concentric arrangements, or incorporated into the robotic manipulator in any other suitable manner.

The vacuum-compatible direct-drive system may comprise a housing and a radial field motor arrangement including a stator and a rotor arranged in the vicinity of the stator so that it may rotate with respect to the stator and interact with the stator through a magnetic field substantially radial with respect to the axis of rotation of the rotor. Alternatively, an axial field motor or a combination radial/axial field motor may be provided, or combinations thereof. The stator may include a set of windings energized by a suitable controller based on the relative position of the rotor with respect to the stator. The rotor may include a set of permanent magnets with alternating polarity.

In the embodiment shown, the housing may separate an atmospheric type environment on the outside of the housing from a vacuum or other non-atmospheric environment inside of the housing. Active components, such as the encoder read head or the stator may be fastened to and/or interface with the housing as will be described, for example, the read head or stator may be pressed into or otherwise fastened to the housing to eliminate conventional clamping components. Here, one or more of the components may be in vacuum, atmosphere or any suitable environment where a barrier, encapsulation, or otherwise, protects the component from the environment, e.g., prevents corrosion, and facilitates efficient heat removal. The wires leading to the active components of the read head or otherwise may pass through an opening of the housing which is sealed, such as by an integrated or separate vacuum feed-through, for example. Alternatively, the read head or stator may be clamped, bolted or attached in any other suitable manner to the housing, and the wires leading from the atmospheric environment to the windings or other active components of the read head or the windings of the stator may be routed through a vacuum feed-through or passed through the wall of the housing in any other suitable manner, for example.

Vacuum robots are used in the fabrication and processing of substrates, such as silicon substrates used in the manufacture of semiconductors for example. Transport of such substrates may be highly sensitive to vibration; particularly with respect to high temperature substrate transport. During transport, the substrates are subject to accelerations. The accelerations are due to vector components associated with moving the substrate along a defined trajectory, and also due to disturbances. The higher the amount of acceleration and vibration associated with disturbances, the less the amount of non-disturbance acceleration that may be applied to the primary intent of moving the substrate along a defined trajectory. Thus, disturbances cause a slower transport trajectory. Disturbances may be associated with mechanical effects, servo controller effects or others factors. Some disturbances may be repeatable. Accordingly there is a desire to compensate for disturbances; both repeatable and otherwise.

By way of example, one repeatable disturbance may be motor cogging. The cogging phenomenon describes the tendency of the permanent magnets on a rotor of a brushless motor to magnetically align with the maximum amount of ferromagnetic material in the stator. In the example where the rotor and stator geometries have rotational symmetry, there can exist several such nominally equivalent rotational positions. The mechanical torque required to push the rotor through these positions of varying magnetic alignment is called cogging torque. The cogging torque changes sign periodically, and its positional dependence is a function of the motor geometric design. With respect to cogging induced vibrations, the source of the vibration and the noise results from motor cogging caused periodic torque of speed-dependent frequency, which acts between the rotor and stator of the motor, and vibrationally excites the structure connected to the rotor and stator of the motor.

Features as described herein may use a repeatable disturbance compensation algorithm, such as a motor cogging compensation algorithm for example. Repeatable disturbances may occur on any axis or combination of axes, such as a lead screw driven axis, a direct drive axis, a gear driven axis, a linear axis, a rotary axis or any other suitable axis. Repeatable disturbances to a motor driven axis may come from any error source such as a torque source for example. Example sources include cogging cycles, such as 12 or other cogging cycles per revolution, a torque ripple, or bearing, transmission or screw imperfections, or mechanically or electrically induced torque variability, or any suitable repeatable source. Repeatable disturbances, such as cogging in a three phase brushless motor for example, is an undesirable feature. If not compensated for in the servo controller or otherwise, it may introduce variability and incremental or excessive noise and vibration into a system, such as a robotic or other suitable system. The algorithm disclosed herein may be used to reduce noise and vibration in the robot structure by predicting the disturbance and supplementing the servo controllers torque output. For example, cogging torque based on its positional periodicity may be used. The overall effect of the disturbance correction algorithm may be used to reduce periodic variations in the speed and/or torque output of structural elements driven by a motor. In one example, a motor cogging compensation algorithm may be used to reduce disturbance or cogging induced vibrations and audible noise.

Repeatable variations, such as torque variations or more specifically by way of example cogging induced vibrations, may be compensated for as disclosed herein. Typically, servo control algorithms for motors do not specifically compensate for the effect of cogging torque. Thus, when the rotor moves to a position corresponding to high cogging torque, it may begin to slow down or be restrained. This slowing of the rotor is observed by a servo controller through encoder based position/speed measurements. The servo then acts to correct the slowing of the motor by increasing winding current and torque. The exact reverse happens when the rotor moves to a position of negative cogging torque. The rotor speeds up and is corrected for by the servo. This periodic slowing and speeding of the rotor and the mechanical load on it may be a major source of mechanical vibration and noise in a robotic system. This may be particularly acute when used in applications requiring low vibration and smooth and quiet operation. If a conventional servo controller does not anticipate the cogging torque, it cannot correct for it until after the rotor motion trajectory has deviated from the target values, thus, inducing a disturbance. Features as described herein overcome and control repeatable disturbance, such as cogging related vibration and noise, through a disturbance or cogging prediction and/or a feed forward control mechanism.

Cogging torque can be reduced at the motor design/selection stage by having large stator shoes, by skewing magnets or stator teeth, and choosing fractional slot/pole ratios. However, with features as described herein, cogging torque can be further reduced through use of a compensation algorithm. With respect to the feed forward, the servo output (expressed in terms of the commanded torque) may correspond to the opposite of the cogging torque or disturbance torque. It is possible to extract this information from the servo output as there are other effects, such as friction, that may be taken into account even under no-load conditions; non-repeatable components may be substantially rejected in the calibration process. The calibration may be accomplished accurately where the servo includes an integrator-type feedback mechanism, such as an I-component or a disturbance observer for example, with a bandwidth substantially higher than the frequency of the cogging torque during the calibration run.

The algorithm may compensate for any repeatable disturbance(s). For example, it may compensate for torque ripple caused by imperfections in sinusoidal properties of a brushless DC motor. As another example, with a ball-screw driven motion axis, it may compensate for mechanical binding that occurs periodically every revolution. Alternately, any suitable repeatable or periodic disturbance may be compensated for.

The disturbance compensation algorithm may be described with respect to a motor cogging compensation algorithm. The algorithm may substantially reduce the vibration and noise produced by motor cogging by introducing a feed forward cogging torque compensation component in the servo controller. In one example, the cogging compensation may be implemented, in summary, as follows:

The compensator may be calibrated by running the motor with only the servo controller and no cogging compensation. The motor is commanded through one full turn at a very low speed and load. The servo output in this scenario corresponds to the cogging torque of the motor. This cogging torque is recorded as a function of the motor position, and implemented as a lookup table.

During cogging compensated operation, the look up table is used by the compensator to add a position dependent torque term to the servo output. This acts as a feed forward compensation for the cogging tendency of the motor, and counteracts the effect of cogging before cogging becomes visible to the servo.

Figure 2:
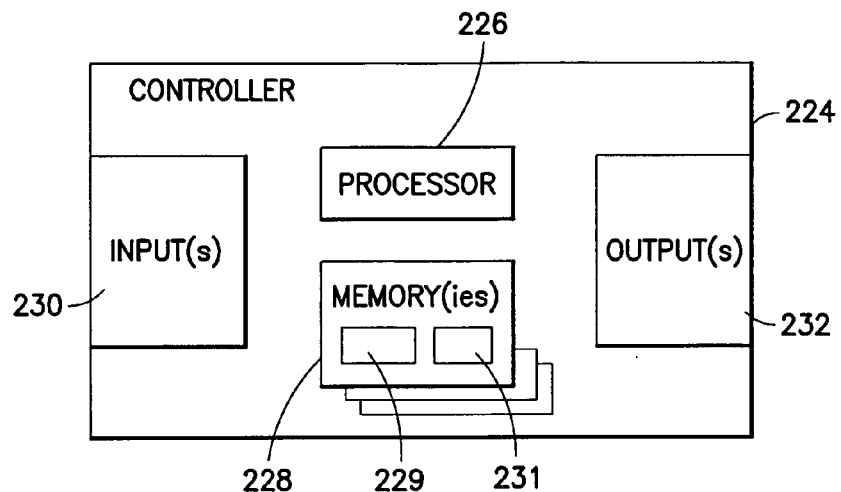
FIG. 2 is a diagram illustrating features of a controller of the apparatus shown in FIG. 1.
Figure 3:
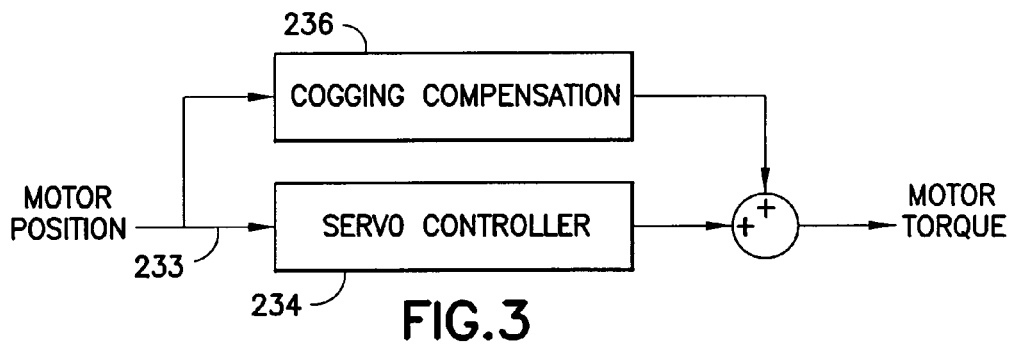
FIG. 3 is a diagram illustrating features of the controller of the apparatus shown in FIG. 1.

The method described above may be used to reduce vibration and audible noise caused by motor cogging in a robotic system, and may be implemented in a robotic controller 224 such as seen in FIG. 1. Referring also to FIG. 2, the controller 224 may comprise a processor 226 and one or more memories 228. Referring also to FIG. 3, the controller 224 comprises an input 230 from the position sensors 110, 111 and an output 232 to the motors 108, 109. Referring also to FIG. 3, the controller 224 is configured to form a servo controller 234 to control the motors 108, 109, such as motor torque and direction for example. The controller 224 is also configured to form a disturbance compensator 236. In the example shown the disturbance compensator 236 is configured to provide cogging compensation. The disturbance compensator 236 may use a look-up table or a compensation algorithm to adjust the torque applied to the motor (s) 108, 109 as described above. The disturbance compensator 236 may comprise use of the processor 226, and data or programming in the memory 223.

Figure 6:
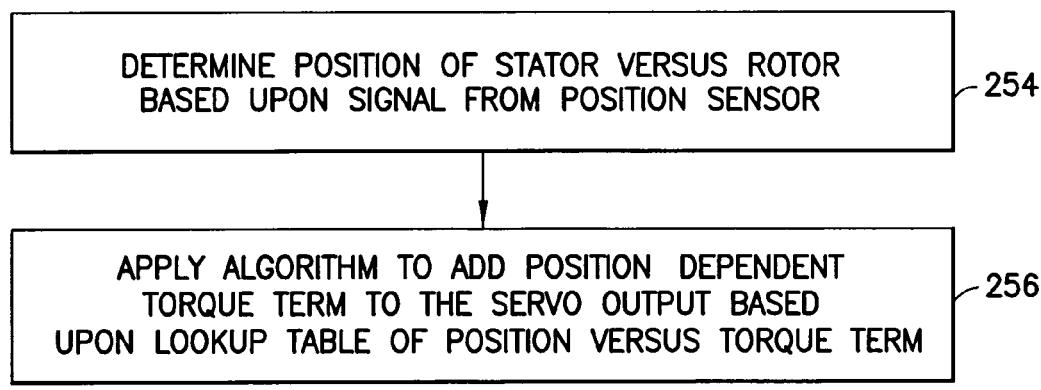
FIG. 6 is a diagram illustrating an example method.

Referring also to FIG. 6, in one example method a disturbance of cogging is addressed, a position is determined as indicated by block 254 and, during the cogging compensated operation, a lookup table is used by the compensator to add a position dependent torque term to the servo output as illustrated by block 256. This acts as a feed forward compensation for the cogging tendency of the motor, and counteracts the effect of cogging before cogging becomes visible to the servo.

In addition to reducing vibration and noise, the compensation algorithm may also improve settling characteristics. For example, the compensation algorithm may also improve position hunting, settling errors, settling time or otherwise. This is because the servo does not need to rely solely on an integrator-type feedback mechanism to overcome disturbances due to cogging or other source(s).

The disturbance compensator 236 is preprogrammed to automatically compensate for predetermined disturbances. In one method the disturbances are calculated by moving the motors by means of only the servo controller 234 and measuring the disturbances. Then the disturbance compensator 236 is preprogrammed to be used to automatically add or subtract from the signals sent by the servo controller 234 to avoid undesired motor movements, such as cogging for example. Stated generally:

Motor movement=signal from servo controller+adjustment made to signal by disturbance compensator After initial measurements of disturbance(s) are taken, the apparatus 10 may be calibrated to implement the disturbance compensation algorithm to remove those disturbances from effecting movement of the motors. The disturbance compensator 236 may also comprise an additional learning algorithm to adjust for disturbances which may arise over time.

In one example, during the calibration process the motor may be commanded to move slowly to minimize or eliminate friction effects. The motor may be rotated through a given cycle multiple times and the results averaged by least squares or otherwise. Data may be collected in different directions, in the same direction or in multiple combinations. During the calibration process, the motor may maintain constant velocity. Alternately, different velocities may be provided and different look-up tables of mathematical representations that are velocity dependent may be provided. The output of the servo may be monitored and stored as function of position over a single revolution or multiple revolutions. For example, in the case of a disturbance that covers multiple revolutions such as a ball screw, transmission or otherwise output of the servo may be monitored and stored as function of position over the multiple revolutions. The output may represent the opposite of the disturbance; for example opposite of a cogging torque. An offset may be applied that represents the friction or steady state load (such as in the case of a vertical lead screw drive for example) to collect the data that is representative of the disturbance.

In providing the feed forward, a delay may be introduced in the system, for example, due to latency, communication, computation delay or otherwise, for example, 500 μs or otherwise. Such a delay may be input into the algorithm as a variable. The algorithm may compensate for the delay by advancing the angle that is applied via the look-up table, or mathematic representation, where the phase advance may be a product of commanded speed and the delay of the system. Further, if there is no such delay or the delay effects are negligible, no such phase advance may be needed.

The disclosed compensation algorithm may be utilized by a single axis of a robot (or other system) that requires smooth motion. Alternately, two or more axis may be provided with the compensation algorithm. The disclosed algorithm reduces the required safety margin that needs to be applied to prevent substrate slippage from vibration or overcoming the coefficient of friction between the substrate and the substrate support or end effector. Further, the disclosed algorithm reduces noise resulting from operation of a given axis. For example, the disclosed algorithm reduces noise resulting from operation of a Z axis in a robot having a ball screw drive as seen in FIG. 1. As an alternative to a look-up table, any suitable mechanism to replicate the repeatable or periodic disturbance may be provided, mathematical or otherwise.

Figure 4:
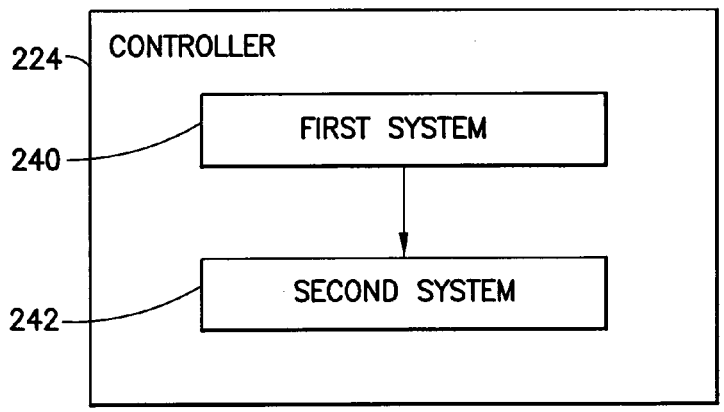
FIG. 4 is a diagram illustrating functional features of the controller shown in FIG. 1.

One type of example embodiment is provided with a controller 224 for a substrate transport apparatus. Referring also to FIG. 4, showing features of the controller in a functional diagram, the controller comprises a first system 240 and a second system 242 for at least partially controlling a movement of a motor of the substrate transport apparatus based upon a signal from a position sensor. The position sensor(s) outputs signal (s) 233 (see FIG. 3) based upon a position of a rotor of the motor relative to a stator of the motor, where torque output of the motor is at least partially controlled based upon the signal from the position sensor, via the servo controller 234 for example. The second system 242 at least partially controls the movement of the motor based upon expected disturbances during movement of an arm of the substrate transport apparatus by the motor. The second system 242 is configured to at least partially increase and/or decrease the torque output of the motor by first system by use of the disturbance compensator 236 (see FIG. 3). The two systems 240, 242 may obviously share some similar or common components, such as the inputs 230 and outputs 232 as well as the processor(s) 226 and memory(ies) 228.

The second system may comprise at least one lookup table 229 having a position dependent torque term to add to the signal from the position sensor. The second system may comprise a feed forward cogging torque compensation component which is adapted to be used by the second system to at least partially increase and/or decrease the torque output of the motor by first system. The second system may comprise a repeatable disturbance compensation algorithm used by the second system to at least partially increase and/or decrease the torque output of the motor by first system. The second system may comprise a motor cogging compensation algorithm used by the second system to at least partially increase and/or decrease the torque output of the motor by first system. The controller may comprise means for reducing noise and vibrations during movement of the substrate transport apparatus caused by predicted disturbances during the movement of the substrate transport apparatus. The second system may further comprise a system for compensating for delay in the second system increasing and/or decreasing the torque output of the motor by first system including a delay from a latency delay, a communication delay, and/or a computation delay. The second system may be configured to at least partially increase and/or decrease the torque output of the motor by the first system based upon direction of the motor and/or velocity of the motor. The second system may be configured to at least partially increase and/or decrease the torque output of the motor by the first system based upon locations of varying magnetic alignment between the rotor and the stator.

Figure 5:
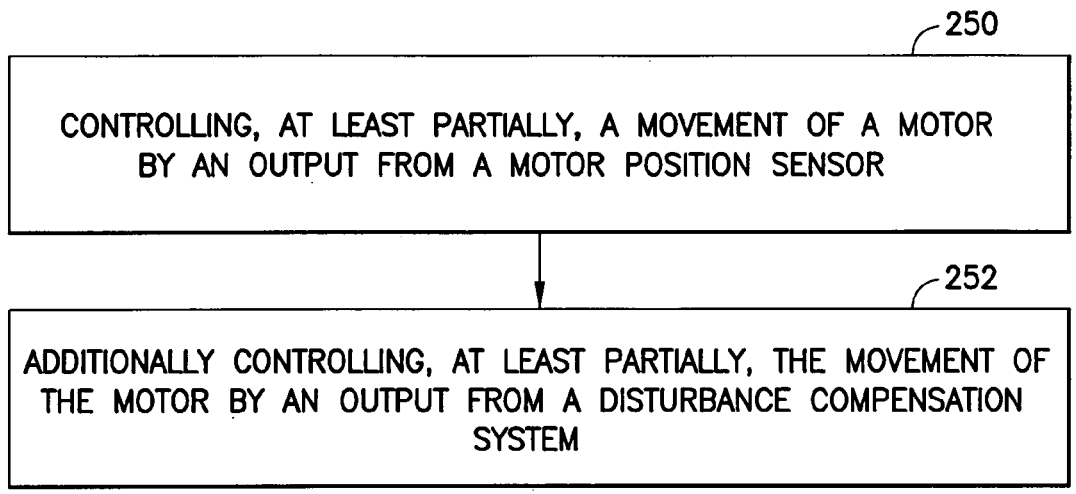
FIG. 5 is a diagram illustrating an example

Referring also to FIG. 5, an example method may comprise: providing an apparatus comprising a drive and a movable arm assembly connected to the drive, where the drive comprises a stator and a rotor; controlling, at least partially, a movement of the motor by an output from a motor position sensor as indicated by block 250; and additionally controlling, at least partially, the movement of the motor by an output from a disturbance compensation system as indicated by block 252, where the output from the disturbance compensation system increases and/or decreases torque output of the motor versus torque output of the motor without the disturbance compensation system output. The second step 252 is done at a same time as the first step 250. However, the first step 250 may be done without the second step 252 at most instances. Thus, the second step 252 is selectively done only to avoid an effect of a disturbance on the motion of the motor as controlled by the servo controller 234.

Additionally controlling the movement of the motor may comprise using at least one lookup table 229 (see FIG. 2) having a position dependent torque term to add to the output from the motor position sensor. Additionally controlling the movement of the motor may comprise generating a feed forward cogging torque compensation component which is used so at least partially increase and/or decrease the torque output of the motor. Additionally controlling the movement of the motor may comprise using a repeatable disturbance compensation algorithm 231 (see FIG. 2) to at least partially increase and/or decrease the torque output of the motor. Additionally controlling the movement of the motor may comprise using a motor cogging compensation algorithm to at least partially increase and/or decrease the torque output of the motor. Additionally controlling the movement of the motor may reduce noise and vibrations during movement of the movable arm assembly by the motor caused by predicted disturbances during the movement of the substrate transport apparatus. The method may further comprise compensating for delay from a latency delay, a communication delay, and/or a computation delay during the step of additionally controlling. Additionally controlling the movement of the motor may comprise at least partially increasing and/or decreasing the torque output of the motor based upon direction of the motor and/or velocity of the motor. Additionally controlling the movement of the motor may comprise at least partially increasing and/or decreasing the torque output of the motor based upon locations of varying magnetic alignment between the rotor and the stator.

An example embodiment may comprises a non-transitory program storage device (such as memory 228 for example) readable by a machine, tangibly embodying a program of instructions executable by the machine for performing operations, the operations comprising: controlling, at least partially, a movement of a motor of a substrate transport apparatus by an output from a servo controller system for the motor to control torque output of the motor; and additionally controlling, at least partially, the movement of the motor by an output from a disturbance compensation system, where the output from the disturbance compensation system causes an increase and/or decrease in the torque output of the motor.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A controller for a substrate transport apparatus, the controller comprising:
    a first system for at least partially controlling a movement of a motor of the substrate transport apparatus based upon a signal from a position sensor, where the position sensor outputs the signal based upon a position of a rotor of the motor relative to a stator of the motor, where torque output of the motor is at least partially controlled based upon the signal from the position sensor; and
    a second system for at least partially controlling the movement of the motor based upon expected disturbances during movement of an arm of the substrate transport apparatus by the motor, where the second system comprises a repeatable disturbance compensation algorithm, where the second system including the repeatable disturbance compensation algorithm is configured to at least partially increase and/or decrease the torque output of the motor by the first system.

2. A controller as in claim 1 where the second system comprises at least one lookup table having a position dependent torque term to add to the signal from the position sensor.

3. A controller as in claim 1 where the second system comprises a feed forward cogging torque compensation component which is adapted to be used by the second system to at least partially increase and/or decrease the torque output of the motor by first system.

4. A controller as in claim 1 where the second system comprises a motor cogging compensation algorithm used by the second system to at least partially increase and/or decrease the torque output of the motor by first system.

5. A controller as in claim 1 comprising means for reducing noise and vibrations during movement of the substrate transport apparatus caused by predicted disturbances during the movement of the substrate transport apparatus.

6. A controller as in claim 1 where the second system further comprises a system for compensating for delay in the second system increasing and/or decreasing the torque output of the motor by first system including a delay from a latency delay, a communication delay, and/or a computation delay.

7. A controller as in claim 1 where the second system is configured to at least partially increase and/or decrease the torque output of the motor by the first system based upon direction of the motor and/or velocity of the motor.

8. A controller as in claim 1 where the second system is configured to at least partially increase and/or decrease the torque output of the motor by the first system based upon locations of varying magnetic alignment between the rotor and the stator.

9. A substrate transport apparatus comprising:
    a drive;
    a movable arm assembly connected to the drive, where the movable arm assembly comprises an end effector; and
    a controller as in claim 1 connected to a motor of the drive.

10. A method comprising:
    providing an apparatus comprising a drive and a movable arm assembly connected to the drive, where the drive comprises a stator and a rotor;
    controlling, at least partially, a movement of the motor by an output from a motor position sensor; and
    additionally controlling, at least partially, the movement of the motor by an output from a disturbance compensation system comprising use of a repeatable disturbance compensation algorithm, where the output from the disturbance compensation system increases and/or decreases torque output of the motor.

11. A method as in claim 10 where additionally controlling the movement of the motor comprises using at least one lookup table having a position dependent torque term to add to the output from the motor position sensor.

12. A method as in claim 10 where additionally controlling the movement of the motor comprises generating a feed forward cogging torque compensation component which is used to at least partially increase and/or decrease the torque output of the motor.

13. A method as in claim 10 where additionally controlling the movement of the motor comprises using a motor cogging compensation algorithm to at least partially increase and/or decrease the torque output of the motor.

14. A method as in claim 10 where additionally controlling the movement of the motor reduces noise and vibrations during movement of the movable arm assembly by the motor caused by predicted disturbances during the movement of the substrate transport apparatus.

15. A method as in claim 10 further comprising compensating for delay from a latency delay, a communication delay, and/or a computation delay during the step of additionally controlling.

16. A method as in claim 10 where additionally controlling the movement of the motor comprises at least partially increasing and/or decreasing the torque output of the motor based upon direction of the motor and/or velocity of the motor.

17. A method as in claim 10 where additionally controlling the movement of the motor comprises at least partially increasing and/or decreasing the torque output of the motor based upon locations of varying magnetic alignment between the rotor and the stator.

18. A non-transitory program storage device readable by a machine, tangibly embodying a program of instructions executable by the machine for performing operations, the operations comprising:
    controlling, at least partially, a movement of a motor of a substrate transport apparatus by an output from a servo controller system for the motor to control torque output of the motor; and
    additionally controlling, at least partially, the movement of the motor by an output from a disturbance compensation system comprising use of a repeatable disturbance compensation algorithm, where the output from the disturbance compensation system causes an increase and/or decrease in the torque output of the motor.

* * * * *